Nov. 12, 1957  P. E. KLEINEBERG ET AL  2,812,847
FLAT ARTICLE ORIENTING MACHINE
Filed Dec. 14, 1956   5 Sheets-Sheet 1
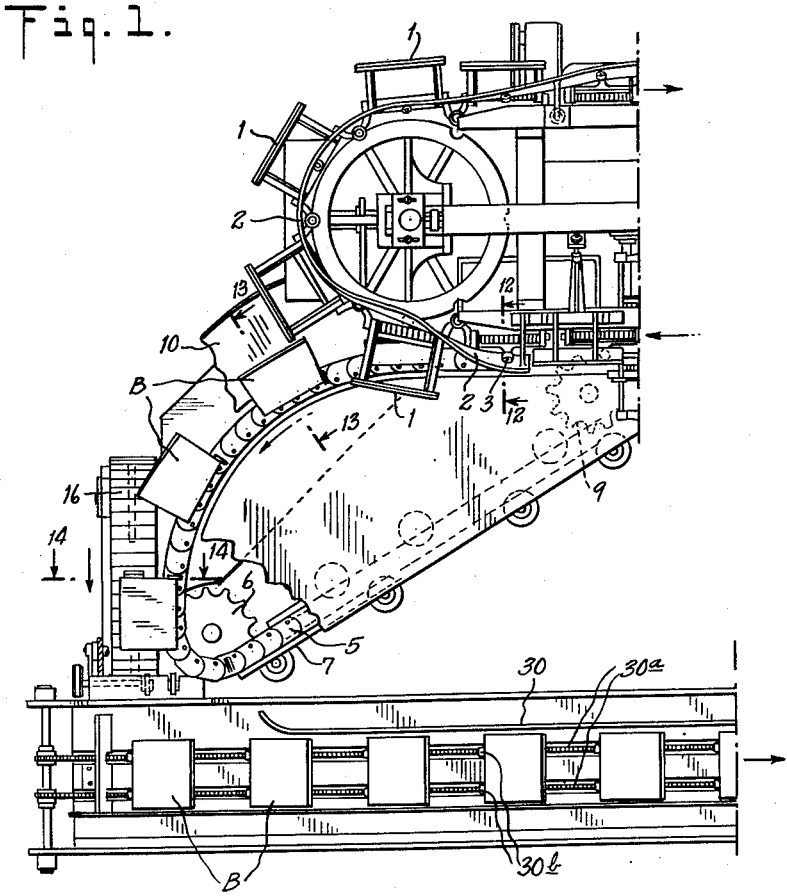
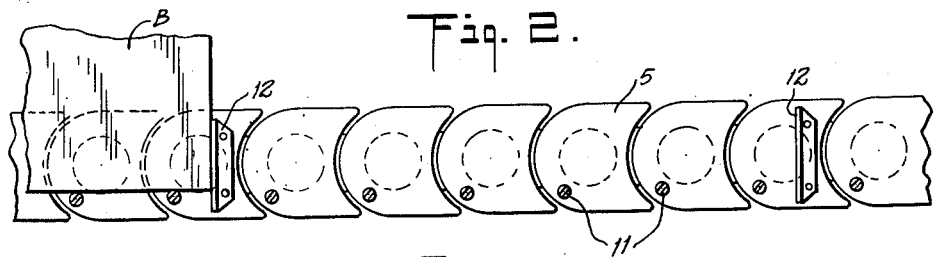
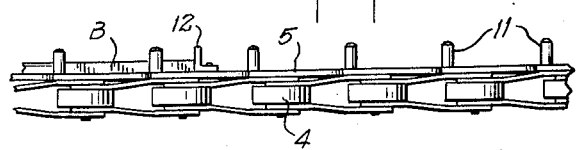
INVENTORS
PAUL E. KEINEBERG
JOSEPH C. ROSEMAN
BY
Kenyon & Kenyon
ATTORNEYS

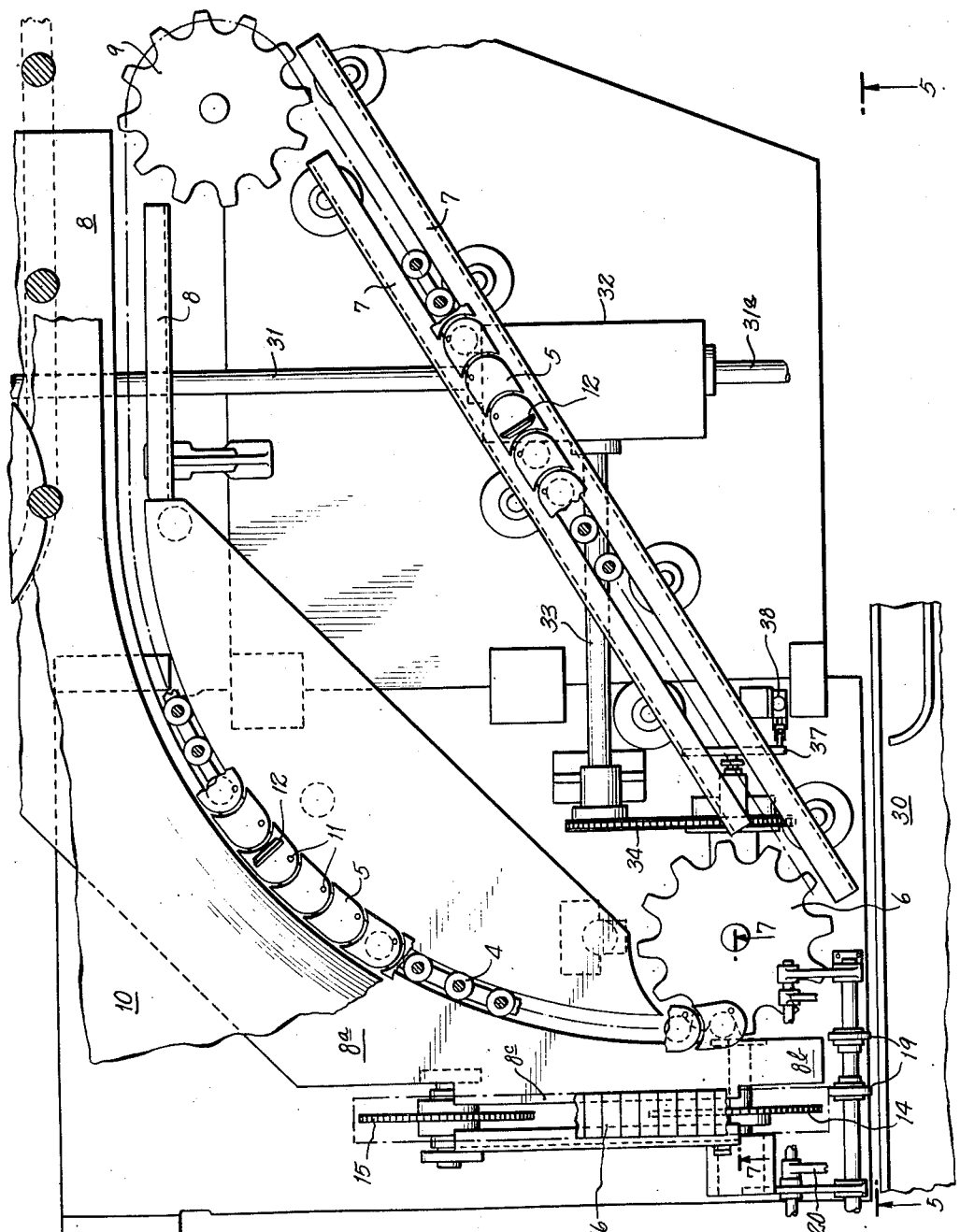

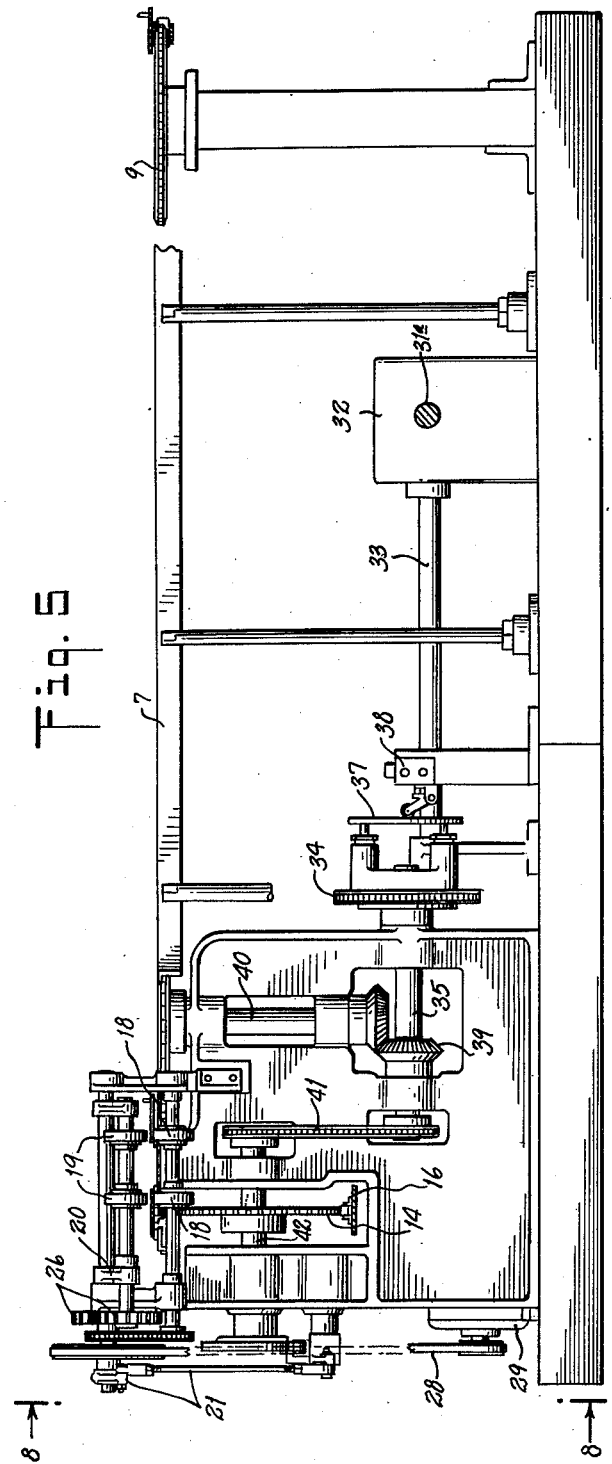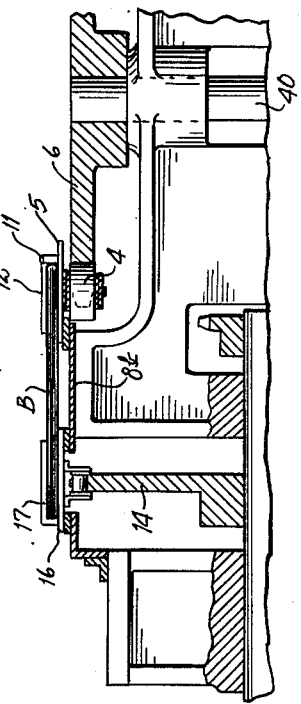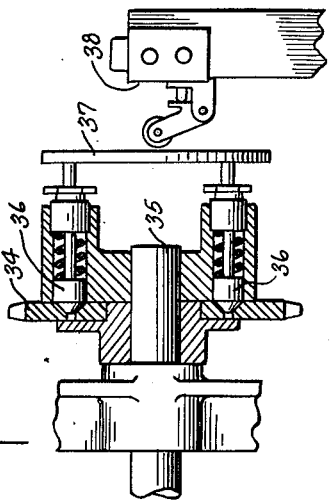

INVENTORS
PAUL E. KEINEBERG
JOSEPH C. ROSEMAN
BY Kenyon & Kenyon
ATTORNEYS

Nov. 12, 1957  P. E. KLEINEBERG ET AL  2,812,847
FLAT ARTICLE ORIENTING MACHINE
Filed Dec. 14, 1956  5 Sheets-Sheet 5

INVENTORS
PAUL E. KEINEBERG
JOSEPH C. ROSEMAN
BY
Kenyon & Kenyon
ATTORNEYS

2,812,847

FLAT ARTICLE ORIENTING MACHINE

Paul E. Kleineberg, Easton, and Joseph C. Roseman, Bethlehem, Pa., assignors to T. W. & C. B. Sheridan Co., New York, N. Y., a corporation of New York Application December 14, 1956, Serial No. 628,277

8 Claims. (Cl. 198—33)

This invention relates to a machine adapted to receive flat articles delivered to the machine in rapid succession and to orient the articles in a predetermined manner and pass them on in the same rapid succession with which they are delivered.

In the specific form disclosed hereinbelow the machine was designed to handle books, this term being used to cover magazines and other periodicals which must be produced in large quantities rapidly.

As an example of its usefulness, a Juengst covering machine, disclosed by Juengst Patent 1,193,395, issued August 1, 1916, delivers books in rapid succession when its jaws open. The books are delivered vertically downwardly with their bound edge lowermost. Such books require trimming and heretofore they have been carried by a suitable conveyor right angularly away from the machine so that they can advance to the trimmer with their bound edges foremost as is required by most commercial trimmers. The trimmer must then be located so that it extends away from the covering machine at right angles to the latter, this arrangement taking up an undesirably large amount of floor space.

In the above instance the present invention may be used to receive the books delivered by the Juengst covering machine, this novel machine then both laying the books down horizontally while turning them around so that their bound edges are at right angles to the covering machine and may be carried to the trimmer by a conveyor located parallel to and relatively close to the covering machine. The trimmer itself may then be arranged parallel to the covering machine so that the entire group of equipment occupies substantially less floor space than has heretofore been possible.

Obviously one of the objects of the present invention is to provide a machine for receiving flat articles, such as books, and turning them around while laying them flat. This must, of course, be done so not to interrupt the rapid flow of successively passing articles. Another object is to perform this operation in the case of books, particularly of the flat periodical type, so as not to damage the books or jam when handling such books.

Generally speaking, the invention in its specific form includes a loop of endless chain having a horizontal section extending between loading and unloading stations. The first station would be at the delivery point of the Juengst covering machine, for example, while the unloading station would be located to deliver the books to the previously mentioned conveyor going to the trimmer. Continuing, a supporting surface extends substantially parallel to the mentioned chain section from the loading station more or less towards the unloading station and this surface slants toward the top of the chain section at the loading station and gradually reduces in its slanting angularity to a substantially horizontal plane. This chain's top has means for engaging the bottom edges of the books to prevent the latter from sliding down the slanting surface, and this top also has means for engaging the trailing edges of the books and pushing the latter over the supporting surface.

As described above it can be seen that the books, or other articles for that matter, are gradually rotated about a horizontal axis so as to shift from roughly vertical to horizontal positions. The described chain section is made to curve in a horizontal plane from the loading station through, for example, a 90° arc after which it may straighten out adjacent to the unloading station. The described supporting surface curves correspondingly to maintain its parallel relationship with the chain section. It follows that the books or other articles are rotated not only about a horizontal axis but also about a vertical axis. This effects a vertical to horizontal positioning combined with turning of the articles to relocate them with respect to their edgewise travel.

This specific form of the invention is illustrated by the accompanying drawings in which:

Fig. 1 is a top view showing the delivery end of a Juengst covering machine to which the machine of the present invention is applied, and also showing the conveyor which carries the unloaded articles parallel to the covering machine and back along the latter's length, parts of the new machine being eliminated to reveal its lower internal construction;

Fig. 2 is a top view showing details of the chain section;

Fig. 3 is a side view of Fig. 2;

Fig. 4 is an enlarged top view of the machine of the present invention, this view also showing a broken-away construction to reveal lower internal parts;

Fig. 5 is a side view taken on the line 5—5 in Fig. 4;

Fig. 6 is an enlargement of a detail shown by Fig. 5 and which is vertically sectioned to reveal the internal construction;

Fig. 7 is a vertical section taken on line 7—7 of Fig. 4;

Figure 8:
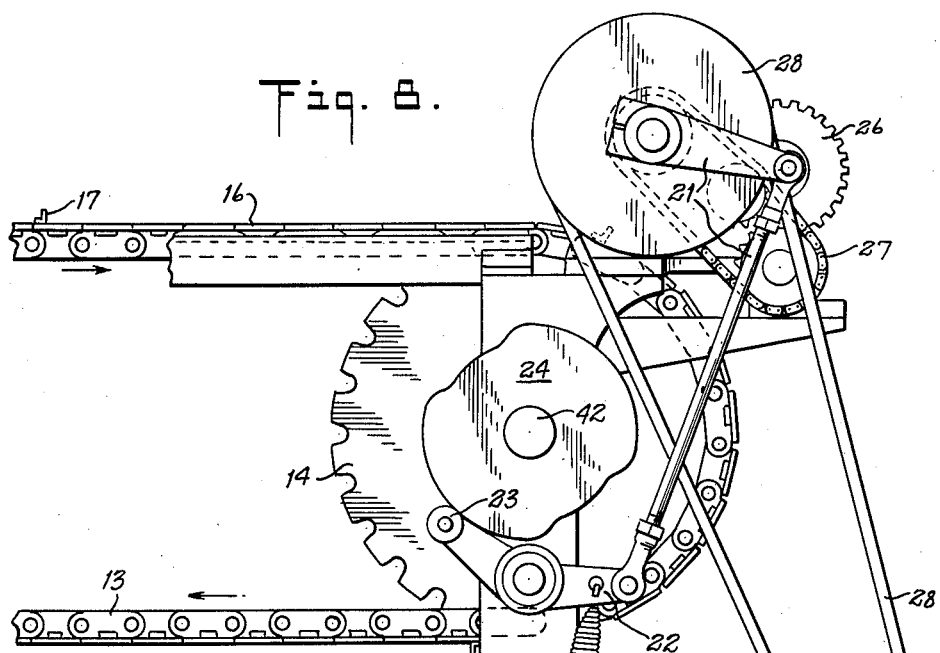
Fig. 8 is an end view of the machine taken on the line 8—8 of Fig. 5.

Referring now to these drawings the Juengst covering machine includes at its delivery end the usual clamps 1 which deliver the covered books' bound edge downwardly when opened by the action of the cam track 2 which operates the clamp cam followers 3. This defines the delivery point of the machine at which the books are delivered in rapid succession and substantially vertically, the books dropping downwardly with their bound edges lowermost.

The machine of the present invention provides a horizontal loop of endless chain 4 of the link-belt crescent flat top type, the tops being shown at 5. This chain is driven by a horizontal sprocket wheel 6 and is guided by various guides 7 and 8 so as to travel linearly below the delivery station of the covering machine, forwardly through a zone which curves through a 90° arc and a terminating zone adjacent to the sprocket wheel 6, the chain then travelling diagonally back to a sprocket wheel 9 so that the chain completes its circuit.

Figure 12:
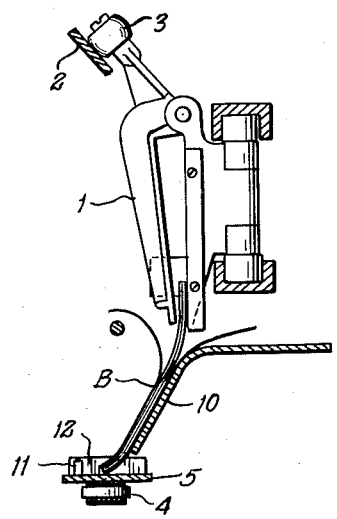
Fig. 12 is a vertical section taken on the line 12—12 in Fig. 1.
Figure 13:
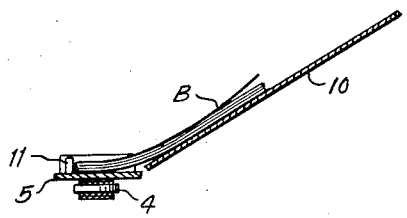
Fig. 13 is a vertical section taken on the line 13—13 in Fig. 1.
Figure 14:
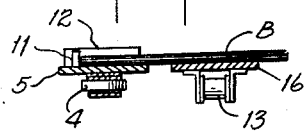
Fig. 14 is a vertical section taken on the line 14—14 in Fig. 1.
Figure 9:
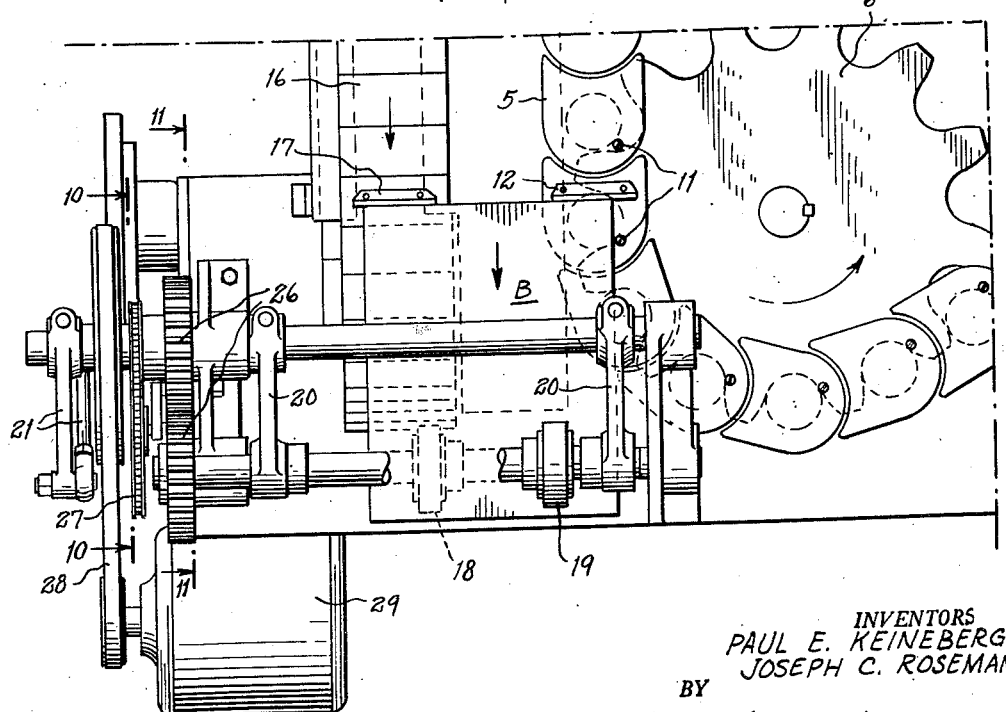
Fig. 9 is a top view showing the complete machine at the location where parts are eliminated in Figs. 1 and 4.

The supporting surface 10 is formed by a very smoothly finished metal slide which slants rather sharply at the delivery point of the covering machine, as shown by Fig. 12, gradually slants less, as shown by Fig. 13, and finally either terminates or becomes horizontal adjacent to the unloading station of the chain 4, this last being shown by Fig. 14. The flat top chain, previously described, is a commercially available product adapted to the present invention by being provided with upstanding pins 11, one for each chain top, located so as to engage the bound edges of the books as they are dropped by the clamps 1. This prevents the books from sliding down the rather steeply slanted starting portion of the slide or surface 10. In addition, at spaced intervals coinciding with the spacing of the clamps 1 of the covering machine, the appropriate ones of the chain tops 5 are provided with upstanding cross members 12 which engage the lower side edges of the books so as to push the latter along over the surface 10. As the books are pushed along they gradually assume the positions shown by Figs. 13 and 14 and, naturally, transitions therebetween. The pins 11 engage only the bottom edges of the books and the latter can, therefore, pivot through the various slanting angles without impedance by the pins 11, and during these shifts in angularity the cross bars 12 remain in firm engagement with the books at all times.

Even at high operating speeds the books are smoothly and evenly laid flat and due to the curve of the chain 4 and the supporting surface 10 which parallels the chain, the books are rotated 90° about a vertical axis. It is relatively easy to make the surface 10 sufficiently smooth throughout so that there is no tendency for the covers of the books to catch or resist the rapid rotational movements in the two planes involved.

The guides 7 are each relatively narrow and function mainly to support the chain as it travels from the sprocket wheel 6 to the sprocket wheel 9.

Curving of the chain 4 is effected by the guides 8. Close to the sprocket wheel 9 the guides 8 are linear, this being the delivery point of the covering machine, and the guides then promptly curve through a quarter of a circle. These curved portions 8a of the guides are shown as relatively wide horizontal plates which provide a table effect. The one of the guides 8 that is on the outside of the curve extends forwardly to provide a horizontal tongue 8b which extends linear. The sprocket wheel 6 is located at about the end of the curve and, therefore, defines the terminating zone for the chain where the chain starts back to the sprocket wheel 9.

In connection with the above it is to be understood that the flat top chain conventionally is guided by plates which engage beneath the various tops as shown by Fig. 7. The guide portion 8b may be overlapped by the slide or surface 10 as the latter approaches or reaches a horizontal plane, this portion 8b then functioning to support the central portion of the book.

The books are marked B in the drawings. Prior to the time the books reach horizontal positions they are gravitationally held against the pins 11 and in front of the cross members or pushers 12. This gravitational positioning becomes less and less until it ceases to exist as the books acquire horizontal positions.

With the above in mind a second sprocket chain 13 is positioned in a vertical plane by sprocket wheels 14 and 15. The top span of this chain 13 extends tangentially with respect to the terminating portion of the curved span of the chain 4.

This chain 13 has flat tops 16 mounted on its side edges so that throughout its upper span these tops 16 are horizontally level with the tops 5 of the chain 4. The chain 13 has cross members or pushers 17 corresponding to the cross members or pushers 12 of the chain 4. The axis of the sprocket wheel 14 is in alignment with the axis of the sprocket wheel 6 transversely with respect to the two chains 4 and 13.

Now it can be seen that before the books can be dragged away from the cross members 12 due to the horizontal positioning of the books, the cross members or pushers 17 can engage the trailing edges of the books and cooperatively with the pushers 12 push the books along properly. The unloading end of the chain 13 coincides with the unloading portion of the chain 4.

At this unloading zone the advancing edge portions of the books ride over a fixed lower roller 18 on which it is nipped by an upper roller 19. This upper roller 19 is mounted on an arm 20 which is periodically lifted by an arm and link connection 21 worked by a rocker arm 22 actuated by a cam follower 23 which bears on a suitably contoured rotary cam 24. The arrangement is such that the roller 19 lifts free from the advancing edge of each book and then drops on the book against which it is urged by a tension spring 25 which biases the rocker arm 22 to cause this effect.

Figure 10:
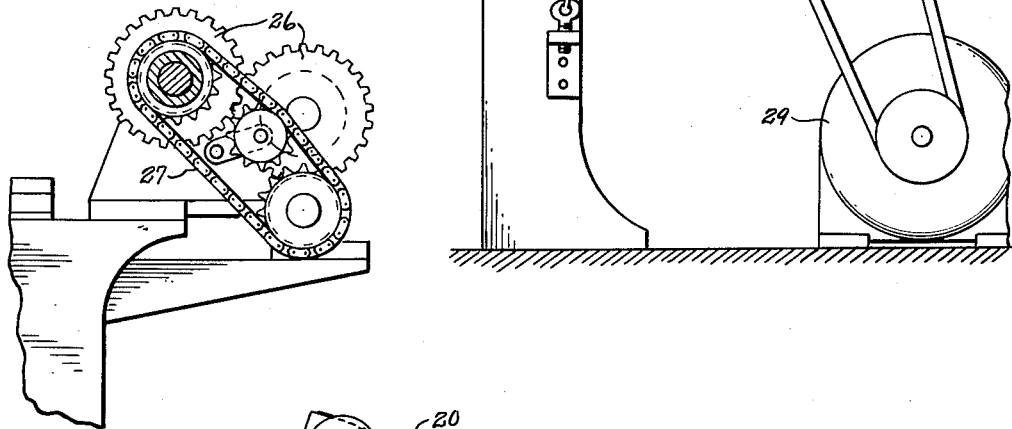
Fig. 10 is a vertical section taken on the line 10—10 in Fig. 9.
Figure 11:
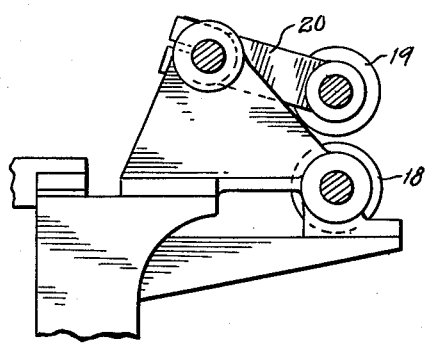
Fig. 11 is a vertical section taken on the line 11—11 in Fig. 9.

As shown by Fig. 10 the rollers 18 and 19 are intergeared by gears 26 permitting the swinging action of the arm 20, these two gears being driven through a sprocket wheel and chain drive 27, and through a pulley and belt drive 28, by an electric motor 29. This drives the rollers 18 and 19 at considerably faster peripheral speeds than the books are pushed by the previously described chains, so the books are in effect snatched from the chains and delivered linearly in their new turned and rotated positions. As shown by Fig. 7 this delivery is a conveyor 30 which may carry the books back along the covering machine substantially parallel to the latter and with the bound edges of the books foremost as required to be loaded in a trimmer where the covers and edges of the books are trimmed flush with each other.

The drive for the new machine is obtained through a shaft 31 which is connected with the drive of the covering machine so that the shaft 31 is turned synchronously with the operation of the covering machine. A right angle gear box 32 receives the shaft 31 and powers a right angular shaft 33 which through a sprocket wheel and chain drive 34 drives a horizontal shaft 35. This drive is made by mounting one of the sprocket wheels, of the drive 34, for free rotation on the shaft 35 and connecting the latter to this sprocket wheel by means of spring biased pins 36 of the type which wedge free from the sprocket wheel in the event of overloading. This protects the machine against jams and if desired the pins 36 may be connected to a plate 37 which moves outwardly when the pins 36 wedge free, and actuates a limit switch 38 which may be connected to the motor driving the covering machine so as to stop everything when trouble occurs.

Right angle gearing 39 connects the shaft 35 with a vertical shaft 40 on the top end of which the sprocket wheel 6 is mounted. Thus the drive of the chain 4 is synchronized with the operation of the covering machine so that as each of the latter's clamps 1 open the covered book is dropped in front of an oncoming one of the cross members 12 of the chain 4.

The shaft 35 also connects to drive the chain 13. This is by way of a sprocket chain and wheel drive 41 which drives a horizontal shaft 42 on which the sprocket wheel 14 is mounted. Thus this sprocket wheel 14 drives the chain 13 synchronously with the chain 4 so that the respective cross members 12 and 17 continuously align transversely with respect to each other. The cam 24 is also mounted on this shaft 42 so that the rollers 19 are lifted at the proper time to clear the oncoming edges of the books.

Obviously the conveyor 30 must also by synchronized with the new machine. This may be done by extending the shaft 31, as at 31a, beyond the right angle gear box 32 and using this shaft 31a to drive the conveyor 30. The latter need not be described in detail. It may comprise laterally interspaced sprocket chains 30a having mutually aligned cross members 30b which carry the books to the trimmer or to any other device such as a counting and stacking machine in the event trimming is not required.

It can be seen that the new machine may be constructed very ruggedly for continuous operation as required by the book binding industry. No small or complicated parts are required. No unusual maintenance problems are involved. It is to be understood that in the event the covering machine delivers a defective book a jam is possible and this is why the machine is provided with means for stopping the operation in the event of jamming.

We claim:

1. A machine for orienting flat articles successively fed thereto in substantially vertical positions, said machine including a conveyor having a travelling section extending between loading and unloading stations and having means for engaging the lower edge portions of said articles when the latter are positioned at various slanting angles, said section travelling substantially horizontally, and a supporting surface extending substantially parallel to said section and which slants towards said section at said feeding station and gradually reduces in its slanting angularity along a substantial length of said section, said supporting surface supporting the sides of said articles while allowing them to move along as their lower edges travel with said conveyor, said supporting surface being substantially horizontal adjacent to said unloading station and being a smooth surface over which said articles are slid by said conveyor section, and a second conveyor having a section extending substantially parallel to the first-named conveyor section adjacent to said unloading station and having means for engaging the trailing edges of said articles.

2. A machine for orienting flat articles successively fed thereto in substantially vertical positions, said machine including a conveyor having a travelling section extending between loading and unloading stations and having means for engaging the lower edge portions of said articles when the latter are positioned at various slanting angles, said section travelling substantially horizontally, and a supporting surface extending substantially parallel to said section and which slants towards said section at said feeding station and gradually reduces in its slanting angularity along a substantial length of said section, said supporting surface supporting the sides of said articles while allowing them to move along as their lower edges travel with said conveyor, said supporting surface being substantially horizontal adjacent to said unloading station and being a smooth surface over which said articles are slid by said conveyor section, and a second conveyor having a section extending substantially parallel to the first-named conveyor section adjacent to said unloading station and having means for engaging the trailing edges of said articles, the first-named conveyor section curving from said loading station to the second-named conveyor and the latter and the mutually opposite portion of the first-named conveyor cooperatively at said unloading station.

3. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface.

4. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface, said section and surface curving from said loading station through substantially a 90° arc.

5. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface, and a second loop of endless chain having a horizontal section adjacent to said unloading station and spaced tangent to the first-named section, this second-named section's top also having means for engaging the trailing edges of said articles and pushing the latter along.

6. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface, and a second loop of endless chain having a horizontal section adjacent to said unloading station and spaced parallel to the first-named section, this second-named section's top also having means for engaging the trailing edges of said articles and pushing the latter along, said first-named section and said surface curving from said loading station to said second-named chain section through substantially a 90° arc and the latter section and the balance of said first-named section being tangent.

7. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface, and a second loop of endless chain having a horizontal section adjacent to said unloading station and spaced tangent to the first-named section, this second-named section's top also having means for engaging the trailing edges of said articles and pushing the latter along, said first-named section and said surface curving from said loading station to said second-named chain section through substantially a 90° arc and the latter section and the balance of said first-named section cooperating, and means for engaging and linearly unloading said articles at said unloading station.

8. A machine for orienting flat articles successively fed thereto in substantially vertical positions, said machine including a loop of endless chain having a horizontal section extending between loading and unloading stations, and a supporting surface extending substantially parallel to said section from said loading station towards said unloading station and which slants towards the top of said chain section at said loading station and gradually reduces in its slanting angularity to a substantially horizontal plane, said chain's top having means for engaging the bottom edges of said articles to prevent the latter from sliding down said surface and having means for engaging the trailing edges of said articles and pushing the latter over said surface, and a second loop of endless chain having a horizontal section adjacent to said unloading station and spaced tangent to the first-named section, this second-named section's top also having means for engaging the trailing edges of said articles and pushing the latter along, said first-named section and said surface curving from said loading station to said second-named chain section through substantially a 90° arc and the latter section and the balance of said first-named section being tangent, and means for engaging and linearly unloading said articles at said unloading station, and a third conveyor for receiving the unloaded articles and carrying them therefrom in a direction at right angles thereto.

References Cited in the file of this patent

UNITED STATES PATENTS

| | | |
|---|---|---|
| 1,710,927 | Hume | Apr. 30, 1929 |
| 2,119,596 | Mintert | June 7, 1938 |
| 2,307,194 | Benning | Jan. 5, 1943 |